United States Patent
Hebert et al.

(10) Patent No.: US 9,483,648 B2
(45) Date of Patent: Nov. 1, 2016

(54) SECURITY TESTING FOR SOFTWARE APPLICATIONS

(71) Applicants: Cedric Hebert, Mougins (FR); Keqin Li, Mougins (FR)

(72) Inventors: Cedric Hebert, Mougins (FR); Keqin Li, Mougins (FR)

(73) Assignee: SAP SE, Walldorf (DE)

( * ) Notice: Subject to any disclaimer, the term of this patent is extended or adjusted under 35 U.S.C. 154(b) by 89 days.

(21) Appl. No.: 13/951,837

(22) Filed: Jul. 26, 2013

(65) Prior Publication Data

US 2015/0033346 A1    Jan. 29, 2015

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/57 | (2013.01) |

(52) U.S. Cl.
CPC ....... *G06F 21/577* (2013.01); *G06F 2221/034* (2013.01)

(58) Field of Classification Search
CPC .................................. G06F 21/577
USPC ........................................ 726/25
See application file for complete search history.

(56) References Cited

U.S. PATENT DOCUMENTS

| | | |
|---|---|---|
| 7,552,480 B1 | 6/2009 | Voss |
| 7,840,944 B2 | 11/2010 | Brunswig et al. |
| 7,904,962 B1 * | 3/2011 | Jajodia et al. ................. 726/25 |
| 8,166,459 B2 | 4/2012 | Suenbuel |
| 8,195,546 B2 | 6/2012 | Wefers et al. |
| 8,196,104 B2 | 6/2012 | Cohrs et al. |
| 8,312,549 B2 | 11/2012 | Goldberg et al. |
| 8,490,196 B2 | 7/2013 | Obes et al. |
| 8,495,744 B2 | 7/2013 | Khoury et al. |
| 8,527,954 B2 | 9/2013 | Benameur et al. |
| 8,607,351 B1 | 12/2013 | Wang et al. |
| 8,839,349 B2 * | 9/2014 | Pearcy et al. ..................... 726/1 |
| 2002/0169789 A1 * | 11/2002 | Kutay et al. ............... 707/104.1 |
| 2007/0143849 A1 | 6/2007 | Adar |
| 2009/0113552 A1 * | 4/2009 | Jin et al. ......................... 726/25 |
| 2011/0093916 A1 | 4/2011 | Lang et al. |
| 2012/0072968 A1 | 3/2012 | Wysopal et al. |
| 2013/0055404 A1 | 2/2013 | Khalili |

OTHER PUBLICATIONS

C. Salter, O. Saydjari, B. Schneier, and J. Wallner, "Toward a Secure System Engineering Methodology", New Security Paradigms Workshop, Sep. 1998, 11 pages.

(Continued)

*Primary Examiner* — Dant Shaifer Harriman
(74) *Attorney, Agent, or Firm* — Brake Hughes Bellermann LLP

(57) ABSTRACT

A mapping engine may be used to determine an attack model enumerating software attacks, the software attacks being represented by linked attack components, and may be used to determine a software architecture to be tested, the software architecture being represented by linked architectural components in an architecture diagram. The mapping engine may then associate each attack component and each architectural component with at least one attack tag characterizing attack requirements. A global test plan generator may be used to determine an attack test model, including associating attack components with corresponding architectural components, based on associated attack tags, and may thus generate attack test workflows from the attack test model, to thereby test the software architecture.

15 Claims, 8 Drawing Sheets

(56) References Cited

OTHER PUBLICATIONS

"BackTrack 4 —The Definitive Guide", Tutorial, Jun. 20, 2009, 9 pages.
"The Guide to Backtrack", Hakin9 on Demand Pen Drives Security, vol. 1, No. 3, Mar. 2012, 26 pages.
Kaleem Shaik, "Metasploit Guide", Feb. 6, 2013, 92 pages.
"The SecurlTree BurgleHouse Tutorial", The SecurlTree Version 2.5 Tutorial, Amenaza Technologies Limited, Aug. 16, 2006, 25 pages.

* cited by examiner

SECURITY TESTING FOR SOFTWARE APPLICATIONS

TECHNICAL FIELD

This description relates to security testing for software applications.

BACKGROUND

Software applications, and particularly software applications which may be accessible over a computer network, may be vulnerable to attacks by unauthorized users. For example, such unauthorized users may attempt to access a software application in order to gain access to data associated with the software application, or to cause the software application to perform a function that is not desired or permitted by a provider thereof.

In order to thwart the efforts of such unauthorized users, developers or other providers of software applications may preemptively execute potential test attacks against a given software application, in order to test an ability of the software application to resist such attacks (including identifying and correcting particular susceptibilities with respect to specific types of potential attacks). However, it may be difficult to perform such security testing of a software application in a manner that is efficient, scalable, repeatable, and effective.

For example, such security testing may be required to span an entire development life cycle of a software application, from application design all the way through executions of specific, deployed implementations of the software application. Moreover, many types of attacks exist, and it may be difficult or impossible to test all of them, given a quantity of available resources.

In practice, software providers may rely on developers of a software application to execute security tests, on the theory that the software developers will be effective in this regard, as a result of the developer's extensive knowledge of the software application in question. However, such software developers may not be experts in the field of application security testing. Conversely, some software providers may utilize third-party security experts to test specific software applications, on the theory that such security experts have a broad and extensive knowledge of potential threats. However, such security experts may not have a desired level of expertise with respect to a specific software application being tested. Further, such third-party security experts may wish to maintain restricted, proprietary knowledge of their testing techniques, so that the provider of the software application under testing does not have transparency or repeatability with respect to the tests performed.

As a result of these and other challenges presented by application security testing, providers of software applications are often unable to achieve a desired quality of security testing. Consequently, the providers may be forced either to expend undesirably large quantities of time and money in an attempt to obtain satisfactory levels of security testing, and/or may ultimately deploy insufficiently-tested applications.

SUMMARY

According to one general aspect, a system may include instructions recorded on a non-transitory computer-readable medium, and executable by at least one processor. The system may include a mapping engine configured to cause the at least one processor to determine an attack model enumerating software attacks, the software attacks being represented by linked attack components, determine a software architecture to be tested, the software architecture being represented by linked architectural components in an architecture diagram, and associate each attack component and each architectural component with at least one attack tag characterizing attack requirements. The system may further include a global test plan generator configured to cause the at least one processor to determine an attack test model, including associating attack components with corresponding architectural components, based on associated attack tags, and further configured to cause the at least one processor to generate attack test workflows from the attack test model, to thereby test the software architecture.

According to another general aspect, a computer-implemented method for executing instructions stored on a computer readable storage medium may include determining an attack model enumerating software attacks, the software attacks being represented by linked attack components, determining a software architecture to be tested, the software architecture being represented by linked architectural components in an architecture diagram, and associating each attack component and each architectural component with at least one attack tag characterizing attack requirements. The method may further include determining an attack test model, including associating attack components with corresponding architectural components, based on associated attack tags, and generating attack test workflows from the attack test model, to thereby test the software architecture.

According to another general aspect, a computer program product may be being tangibly embodied on a non-transitory computer-readable storage medium and may include instructions that, when executed, are configured to determine an attack model enumerating software attacks, the software attacks being represented by linked attack components, determine a software architecture to be tested, the software architecture being represented by linked architectural components in an architecture diagram, and associate each attack component and each architectural component with at least one attack tag characterizing attack requirements. The instructions, when executed, may be further configured to determine an attack test model, including associating attack components with corresponding architectural components, based on associated attack tags, and generate attack test workflows from the attack test model, to thereby test the software architecture.

The details of one or more implementations are set forth in the accompanying drawings and the description below. Other features will be apparent from the description and drawings, and from the claims.

DETAILED DESCRIPTION

Figure 1:
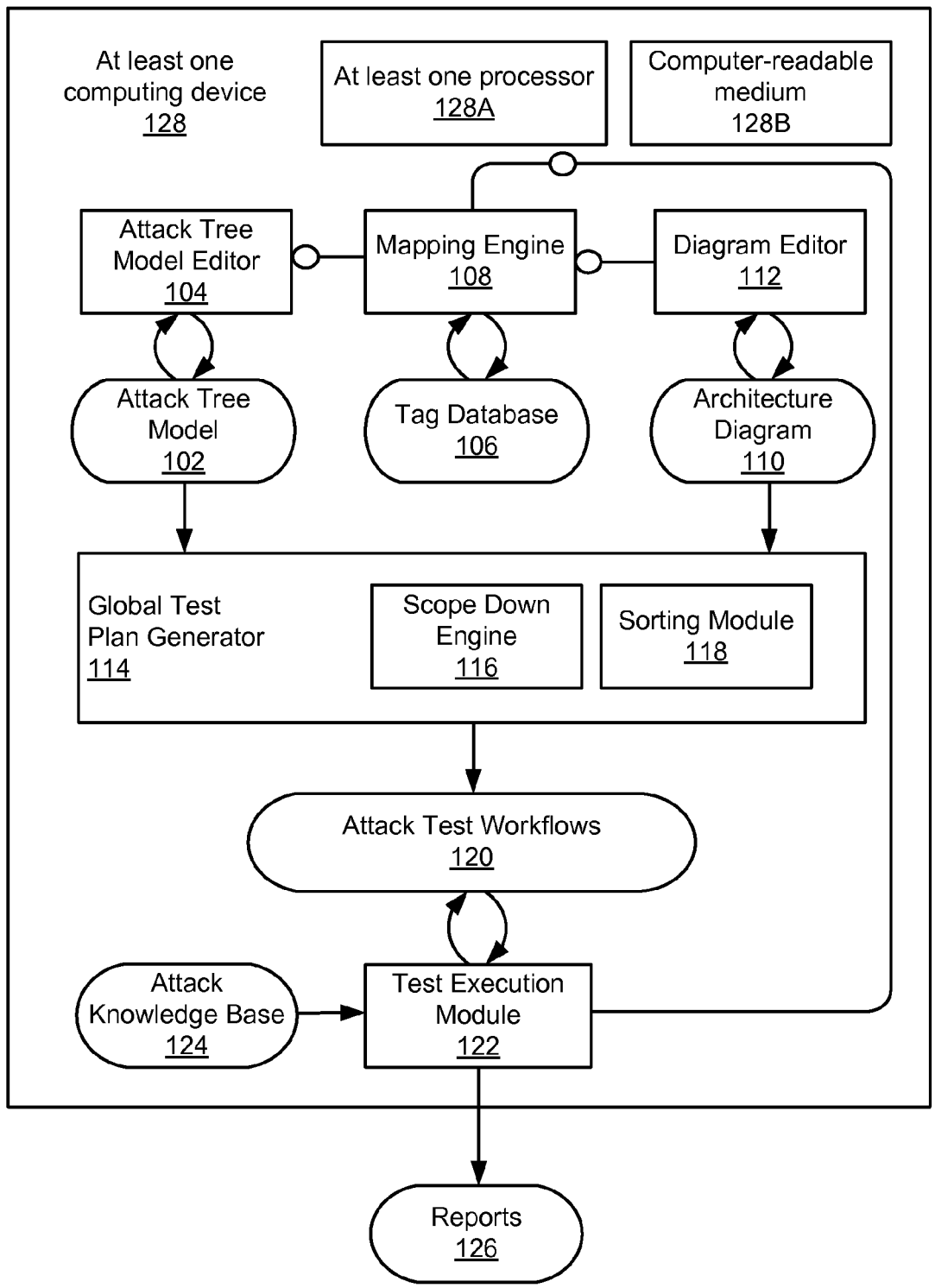
FIG. 1 is a block diagram of a system for performing effective application security testing.

FIG. 1 is a block diagram of a system 100 for performing effective application security testing. As described in detail below, the system 100 provides for application security testing in a manner that is thorough, scalable, and highly efficient with respect to usage of available time and resources. More specifically, the system 100 determines the most useful/necessary potential attacks to test, as well as a manner in which the potential attacks may be executed as security test cases that may be run by a non-expert. Moreover, the system 100 determines an order in which such security test cases should be executed, from the most critical to the least critical, depending on associated testing objectives and available cost/time resources available for the test cases in question. Still further, the system 100 enables the capturing of information related to the execution and results of each selected test case, so as to thereby ensure transparency, coverage, and repeatability.

In the example of FIG. 1, the system 100 utilizes an attack tree model 102, which generally represents an enumerated listing of available or potential security attacks. For example, the attack tree model 102 may represent a comprehensive list of all known attacks, which are included therein independently of any underlying technology which might be utilized or necessary for executing a given attack.

For example, the attack tree model may include a type of attack known as SQL (structured query language) Injection, even though, at an initial stage, it may not be known whether a software application that is to be tested will include an SQL database typically associated with such an attack. In another example, a different portion of the attack tree model may include a DLL (Dynamic Link Library) Highjack, even though, again, it may not be known whether an application to be tested will be executed in a windows-based environment that might utilize DLL libraries associated with such an attack.

In the examples that follow, the attack tree model 102 is assumed to represent a listing of all known attacks, where such attacks, by themselves, are assumed to be known to members of application security testing communities. Moreover, it is assumed that new attacks will be developed during an operational lifetime of the system 100, and, again, the details and characteristics of such attacks are assumed to be known by an operator, administrator, provider, or other user of the system 100. Consequently, detailed examples of characteristics and implementations of attacks included within the attack tree model 102 are not provided in detail herein, except as may be necessary or helpful in understanding operations of the system 100.

In the examples that follow, the attack tree model 102 is illustrated and described as a tree structure of linked branches, nodes, and leaves. For example, nodes representing specific aspects of a particular attack may be linked by branches to underlying nodes/components which are necessary for implementation thereof. Such branching structure may be repeated until a lowest level of the attack in question is reached, which thus represents a leaf node of the tree structure. A simplified example of a portion of such an attack tree structure is illustrated and described below, e.g., with respect to FIG. 3.

In the examples described herein, the attack tree structure just described may be associated with a single target application to be tested, which is considered as a single, atomic component. For example, the attack tree model may be utilized for testing a database as its target, or a firewall, but, in the described examples, would not be associated with a combination of a database behind a firewall. Instead, as described in detail below, in order to execute security testing with respect to such combinations of targets to be tested, multiple instances of the attack tree may be created, where each attack instance is thereafter associated with a single, atomic component to be tested.

For example, the attack tree model may include a node of "read data from database," which may branch into linked sub-nodes of "perform SQL injection" and "sniff traffic." If a subsequent instance of the attack tree model is utilized for security testing of a database, then this portion of the attack tree model may be utilized in associated security testing. In contrast, if a different instance of the attack tree model were utilized for testing a firewall, then the described portion of the attack tree instance may be deleted, while other portions relevant to firewall testing would be included.

Thus, in the described examples, the use of such a single, comprehensive attack tree enables agnosticism of the attack tree from any underlying application or execution context. As a result, users of the system 100 may simply include all known attacks within the attack tree model 102, as such attacks become known, and without regard to future applications which might be tested.

Of course, such implementations are intended merely as examples, and it will be appreciated that many other example embodiments may be implemented. For example, a plurality of attack trees could be structured, where each such attack tree is specific to a particular type of application and/or execution environment. Additionally, or alternatively, various implementations may list elements of the attack tree model 102 in one or more structures other than the tree structure described herein.

In many of the embodiments and implementations just described, the attack tree model 102 may be constructed and managed using an attack tree model editor 104. For example, the attack tree model editor 104 may represent a user interface (e.g., a graphical user interface (GUI), not explicitly illustrated in the example of FIG. 1) that enables a user of the system 100 to, e.g., add or remove attacks or attack components from the attack tree model 102, or to rearrange or reconfigure specific aspects of the attack tree model 102.

Further in the example of FIG. 1, a tag database 106 is illustrated, which includes individual tags which enumerate specific requirements for successful completion of a particular attack. For example, as referenced above, an SQL injection attack generally requires use of an SQL database in order to be successful. Consequently, an SQL tag within the tag database 106 may be included for association thereof with one or more branches of the attack tree model 102 that reference(s) SQL injection attacks. Similarly, a DLL highjack attack might be associated with a tag for identifying a windows environment and/or a DLL library tag demonstrating usage of DLL libraries. In yet another example, the tag database 106 may include a tag "user input," which represents an attack requirement for attacks such as cross-side scripting that require input from future application users.

A mapping engine 108 may be configured to access the tag database 106, and may be further configured to annotate individual components of the attack tree model 102 with corresponding tags therefrom. In operation, the mapping engine 108 may automatically associate tags of the tag database 106 with components of the attack tree model 102. For example, the mapping engine 108 may execute syntactic or semantic matching, based on a presence of identical or related terminology within a specific tag and a corresponding specific component of the attack tree model (e.g., may match the term SQL within a tag of the tag database 106 with a term SQL injection within the component of the attack tree model 102).

In example implementations, the attacks of the attack tree model 102 may each be associated with a corresponding description thereof, and the mapping engine 108 may utilize such a description to perform the types of syntactic/semantic matching just referenced. In other example implementations, at least an initial association of individual tags with individual components of the attack tree model may be facilitated manually by a user of the system 100. Moreover, as described in more detail below, the mapping engine 108 may utilize feedback received from a user of the system 100 in conjunction with subsequent security testing.

Meanwhile, an architecture diagram 110 represents a diagram or other representation of a software application to be tested. That is, for example, the architecture diagram 110 may include a number of architectural components of a given software application, where the components are linked in a manner which reflects an operational structure of the relevant software application. In some implementations, the architecture diagram 110 may have been partially or completely developed in conjunction with a design of the associated software application. In other examples, the architecture diagram 110 may be partially or completely created manually by the user of the system 100, based on an analysis of a given software application to be tested. In yet additional or alternative examples, the architecture diagram 110 may be created automatically, using a software-based analysis of the application code of the software application in question.

As with the attack tree model editor 104, a diagram editor 112 may be provided which enables a user of the system 100 to create, update, or otherwise manage the architecture diagram 110. For example, the diagram editor 112 may be utilized to identify and modify a model of a specific software application developed in association with a design of the software application, for use of the architecture diagram 110. Of course, the diagram editor 112 may similarly be used to manage the architecture diagram 110 when the architecture diagram 110 has been created using any of the example techniques described above, or other techniques, or combinations thereof.

As described above with respect to the attack tree model 102, the mapping engine 108 may be configured to selectively add tags from the tag database 106 to individual components of the architecture diagram 110. For example, similarly to the examples above, an SQL database component of the architecture diagram 110 may be tagged with an SQL tag. In another example, hypertext markup language (HTML) forms identified within the architecture diagram 110 may be tagged with "user input" tags. As with the attack tree model 102, the mapping operations of the mapping engine 108 may be executed automatically. Additionally, or alternatively, some or all of the mapping operations may be executed manually, e.g., by way of the diagram editor 112, and/or using a separate interface associated with the mapping engine 108.

Once the attack tree model 102 and the architecture diagram 110 have been tagged appropriately in the manner described above, a global test plan generator 114 may receive the tagged attack tree model 102 and tagged architecture diagram 110, for a combination thereof. More specifically, as described in detail below, the global test plan generator 114 may determine tags that are common to individual components of the attack tree model 102 and the architecture diagram 110, and may thereafter link such commonly-tagged components to one another.

More specifically, as described in detail below, the global test plan generator 114 may combine the tagged attack tree model 102 and the tagged architecture diagram 110 by replicating or instantiating the attack tree model 102 for each component of the tagged architecture diagram 110. For example, as described in detail below with respect to the examples of FIGS. 5-8, the architecture diagram 110 may include a database protected by a firewall and communicating over a hypertext transfer protocol (HTTP) channel. In such an example, a separate instance of the tagged attack tree model 102 may be attached to each of the firewall, the database, and the HTTP channel.

Subsequently, in these and other example implementations, a scope down engine 116 may be configured to detect common tags existing within each such instance of the attack tree model 102 and its corresponding component of the architecture diagram 110. In conjunction therewith, the scope down engine 116 may remove from each instance of the attack tree model 102 any component thereof which does not share a common/related tag(s) with its corresponding component of the architecture diagram 110.

For example, continuing in the examples above, an instance of the attack tree model 102 attached to an SQL database component of the architecture diagram 110 may be identified as including attack tree components related to, i.e., tagged with, "SQL." Consequently, such portions of the attack tree model instance may be retained and combined with the SQL-tagged component (e.g., database) of the architecture diagram 110, while all other components of that instance of the attack tree model 102 may be filtered, or otherwise removed or deleted. Similar comments would apply to the "user input" tags associated with cross-side scripting attacks within the attack tree model 102 and HTML forms of the architecture diagram 110. More detailed example aspects of operations of the scope down engine 116 are described in detail below, e.g., with respect to FIGS. 4 and 9.

The result of the above-described operations of the global test plan generator 114 and the scope down engine 116 is an attack test model in which each component of the tagged architecture diagram 110 is associated with, e.g., linked to, a filtered instance of the attack tree model 102 containing only those components thereof which were tagged similarly. The resulting attack test model may then be analyzed to determine actual attack test workflows that are executable as security test cases against the relevant software application.

In practice, as referenced above, it may not be possible or desirable to execute all such test cases. For example, there may be insufficient resources available to perform all such test cases within an available amount of time.

Consequently, a sorting module 118 of the global test plan generator 114 may be configured to sort and prioritize the generated attack test workflows, in order to thereby ensure that the most important or critical test cases are implemented. Operations of the sorting module 118 are described in more detail below, e.g., with respect to FIG. 4.

Thus, the global test plan generator 114 may ultimately generate a sorted, prioritized list of attack test workflows 120, which may then be executed using a test execution module 122. As shown, the test execution module 122 may utilize an attack knowledge base 124. For example, the attack knowledge base 124 may be utilized to provide useful input parameters, expected output parameters, and other information which may be useful or necessary in implementing specific test cases by the test execution module 122.

For example, as referenced above, a user of the test execution module 122 may be a non-expert in the field of application security testing (e.g., may instead be an expert in the underlying software being tested). Advantageously, as described, the providing of the sorted, prioritized attack test workflows 120 provides such a non-expert with clear direction in terms of what tests to perform, and when to perform them. Somewhat similarly, the attack knowledge database 124 informs such a non-expert user about how specifically to implement each attack test workflow of the attack test workflows 120.

As illustrated in FIG. 1, the test execution module 122 may be in communications with the mapping engine 108, so that operations of the test execution module 122 may be reflected within future operations of the mapping engine 108. In this way, operations of the mapping engine 108 may be improved over time.

For example, as described, operations of the mapping engine 108 are intended to accurately tag individual components of the attack tree model 102 and the architecture diagram 110. However, it may occur that, in a given scenario, a specific tag is incorrectly included with respect to a specific component, or that a tag is incorrectly omitted from being included with a specific component. In such cases, it may occur that corresponding errors arise during operations of the test execution module 122.

For example, during execution of a given test, a user may determine that a specific attack test is incorrectly associated with a corresponding attack target. In such cases, an automatic notification may be sent to the mapping engine 108, and, additionally or alternatively, the user may utilize an appropriate user interface of the mapping engine 108, as referenced above, to notify the mapping engine 108 that the tag in question was incorrectly applied to one or both of the corresponding components of the attack tree model 102 and the architecture diagram 110.

As the tests are completed, the test execution module 122 may generate corresponding reports 126. The reports 126 may thus include detail regarding a nature of the test cases implemented, as well as the results thereof. For example, the reports 126 may provide a desired level of detail regarding when and how an individual test was executed, and may report whether the test was partially or completely successful in reaching the designed security of a relevant component of the architecture diagram 110.

Finally in the example of FIG. 1, the system 100 is illustrated as being executed using at least one computing device 128. As shown, the at least one computing device 128 may include at least one processor 128A, as well a computer readable medium 128B.

Thus, for example, the at least one computing device 128 may represent a single computing device executing all of the components 102-126 of FIG. 1. Alternatively, the at least one computing device 128 may represent two or more computers, in communication with one another, and each executing at least one or more of the components 102-126.

Similarly, the at least one processor 128A may represent two or more processors operating in parallel. Meanwhile, the computer readable medium 128B may represent one or more computer memories that may be used to store, e.g., instructions which are executable by at least one processor 128A to thereby execute operational aspects of the components 102-126. Of course, the computer readable medium 128B also may represent one or more memories used to store data utilized by any one of the components 102-126.

Somewhat similarly, it may be appreciated that the various components 102-126 of FIG. 1 are illustrated as separate, discrete components, for the sake of ease of explanation and understanding. However, it may be appreciated that, in operation, any single component illustrated in FIG. 1 may be executed using two or more subcomponents thereof in communication with one another. Conversely, any two or more components of FIG. 1 may be combined for operation as a single component.

Figure 2:
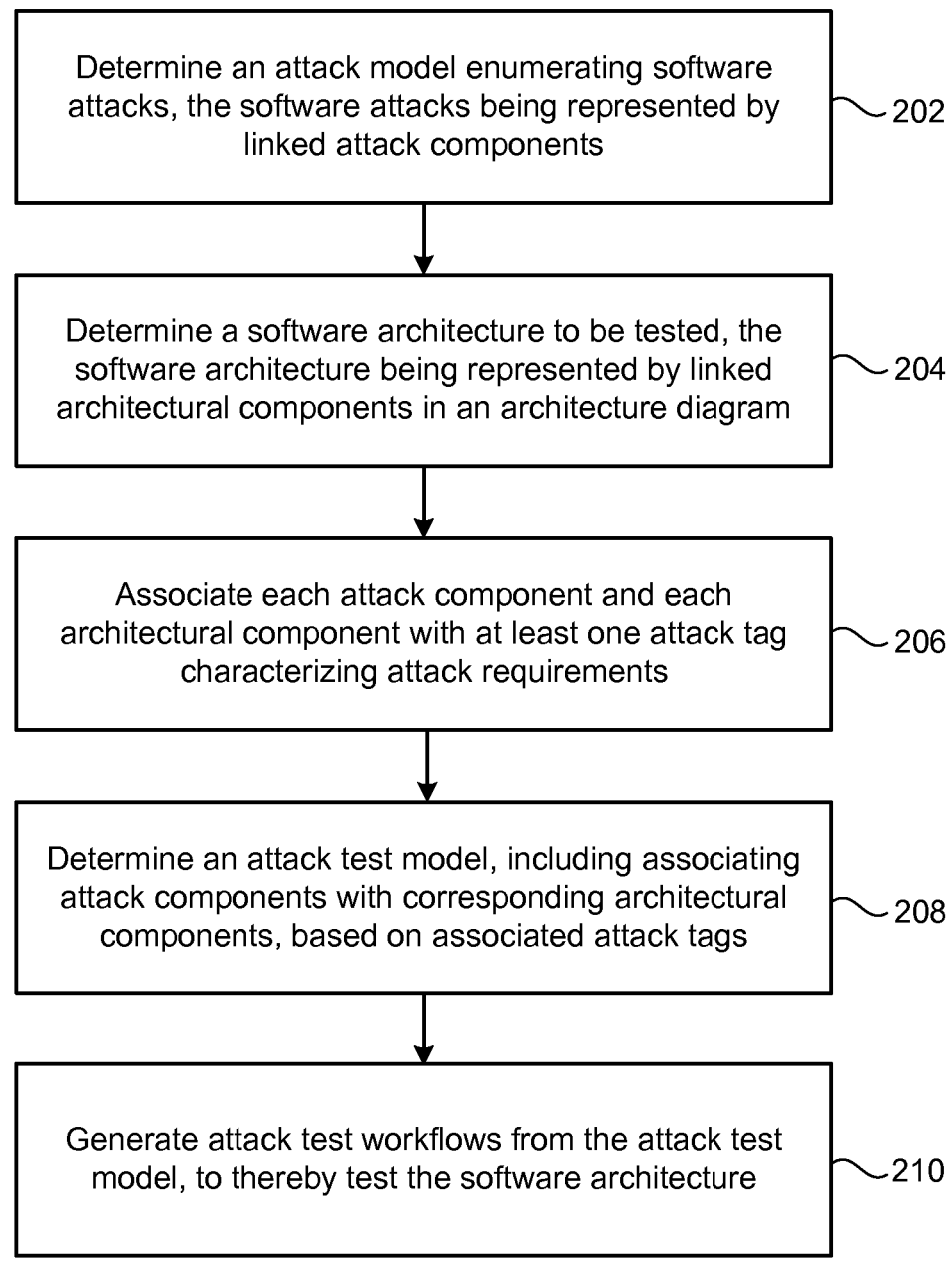
FIG. 2 is a flowchart illustrating example operations of the system of FIG. 1.

FIG. 2 is a flowchart 200 illustrating example operations 202-210 of the system 100 of FIG. 1. In the example of FIG. 2, the operations 202-210 are illustrated as separate, sequential operations. However, it may be appreciated that any two or more of the operations 202-210 may be executed in a partially or completely overlapping or parallel manner. Further, additional or alternative operations may be included, while one or more operations may be omitted in any specific implementation. In all such implementations, further, it may be appreciated that various operations may be implemented in a nested, looped, iterative, and/or branched fashion.

In the example of FIG. 2, an attack model enumerating software attacks may be determined, the software attacks being represented by linked attack components (202). For example, as described above, the attack tree model editor 104 may be utilized to identify, construct, or otherwise modify or manage the attack tree model 102, and the mapping engine 108 may be configured to determine the attack model 102 as managed by the attack tree model editor 104. As described, the attack tree model 102 may be implemented in a tree structure in which individual attack components are linked together in a branched fashion. For example, the linked attack components of the attack model may be arranged in a tree structure, in which individual parent attack components represent an attack result or attack operation, and are connected by branches to one or more child components representing attack operations for reaching the attack result or attack operation of the parent component. However, as also may be appreciated, various other data structures may be used to represent such an attack model.

A software architecture to be tested may be determined; the software architecture is being represented by linked architectural components in an architecture diagram (204). For example, as also described, the diagram editor 112 may be utilized to identify, create, or otherwise manage the architecture diagram 110, and the mapping engine 108 may be configured to determine the architecture diagram 110 as managed by the diagram editor 112. As described, the architecture diagram 110 may be constructed in a tree-type structure, or in any suitable structure that is the same as, or compatible with, the selected data structure for the attack model to be associated therewith (e.g., the attack tree model 102).

Each attack component and each architectural component may be associated with at least one attack tag characterizing attack requirements (206). For example, the mapping engine 108 may be configured to select individual attack tags from the tag database 106, for association thereof with individual components of the attack tree model 102 and the architecture diagram 110.

An attack test model may be determined, including associating attack components with corresponding architectural components, based on associated attack tags (208). For example, the global test plan generator 114 may be configured to receive the tagged attack tree models 102 and the tagged architecture diagram 110, and to associate individual components thereof with one another, based on common tags of the tag database 106.

Finally in the example of FIG. 2, attack test workflows may be generated from the attack test model, to thereby test the software architecture (210). For example, the global test plan generator may be configured to generate the attack test workflows 120 of FIG. 1, for execution by the test execution module 122, as described.

Figure 3:
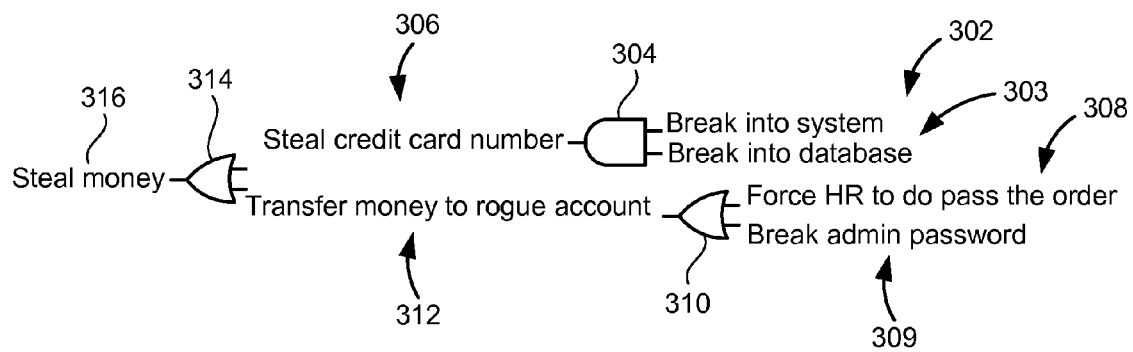
FIG. 3 is an illustration of an example attack tree used in the system of FIG. 1.

FIG. 3 is a simplified example of a portion of the attack tree model 102 instantiated with respect to a particular component of the architecture diagram 110. For example, such a component of the architecture diagram 110, not specifically illustrated in the example of FIG. 3, may represent or be associated with a financial account of a customer of a bank or other financial institution, so that a need would exist to protect such a financial account from unauthorized or illegal seizures of financial assets included therein.

In other words, FIG. 3 illustrates the scenario referenced above in which the global test plan generator 114 has instantiated the attack tree model 102 for association of the resulting attack tree model instance with the just-mentioned financial account, and the scope down engine 116 has removed all non-related components of the attack tree model instance. Consequently, as shown, the resulting/remaining components of the attack tree model instance include all attack components associated with the ultimate goal of illicitly obtaining funds from the linked financial account.

Specifically, as shown, components "break into system" 302 and "break into database" 303 are both required, as illustrated by the AND connector 304, in order to achieve the result of attack component "steal credit card number" 306. Meanwhile, as also shown, attack components "force human resources (HR) to do pass the order" (308) or component "break admin password" 309 may individually be sufficient, as represented by OR connector 310, to result in attack component "transfer money to rogue account" 312. Similarly, either of the resulting attack components "steal credit card number" 306, or "transfer money to rogue account" 312 may be sufficient, as represented by a second OR connector 314, to result in the final attack component "steal money" 316.

In the terminology of the operation 208 of FIG. 2, then, the example of FIG. 3 may be understood to represent an attack test model, which, as described above with respect to operations 208, 210, may be utilized by the global test plan generator 114 to generate corresponding attack test workflows. For example, the global test plan generator 114 may generate, from the attack test model of FIG. 3, a first attack test workflow, which includes the following steps: (1) break into system, (2) break into database, (3) steal credit card number, (4) steal money. The global test plan generator 114 may generate a second attack test workflow including the following steps: (1) force HR to do pass order, (2) transfer money to rogue account, (3) steal money. The global test plan generator 114 may generate a third attack test workflow from the attack test model of FIG. 3 which includes the following steps: (1) break admin password, (2) transfer money to rogue account, (3) steal money.

As may be observed, the first workflow includes both attack test components 302, 303, because these attack test components are both required due to presence of the AND connector 304. In contrast, the second and third workflows each include only one of the attack test components 308, 309, because only one such attack component is required to precede to the attack component 312, as indicated by the OR connector 310. Further details and examples regarding attack test models such as the attack test model of FIG. 3, as well as a conversion thereof into corresponding attack test workflows, are provided below with respect to FIGS. 4-9.

Figure 4:
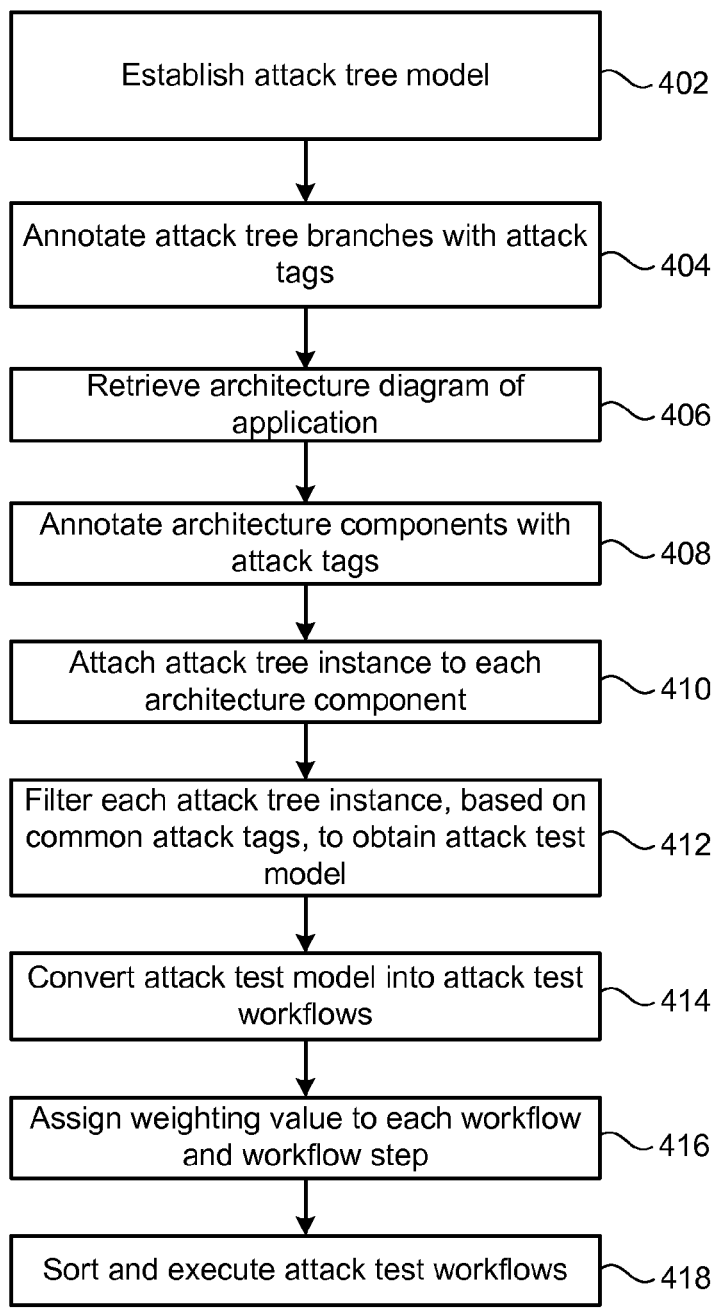
FIG. 4 is a flowchart illustrating more detailed example operations of the system of FIG. 1.

FIG. 4 is a flowchart 400 illustrating more detailed example operations of the system 100 of FIG. 1. In the example of FIG. 4, an attack tree model may be established (402), such as the attack tree model 102 of FIG. 1. As described, the attack tree model 102 may be agnostic with respect to one or more software applications to be tested. As described and illustrated with respect to FIG. 3, the attack tree model 102 may be structured so that attack components are included in a way which represents the manner in which the attack components must be combined and/or ordered in order to execute a successful attack.

The mapping engine 108 may then proceed to annotate all the attack tree branches with attack tags from the tagged database 106 (404). As described, such attack tags represent requirements for successfully completing the associated aspect of a given attack. As such, it may occur that a given tag may be applied successively to each connected branch of a particular type of attack, while, additionally or alternatively, other individual tags may be associated individually with specific branches/components of the attack tree model.

Somewhat similarly, an architecture diagram of an application to be tested may be retrieved (406), and individual application components of the architecture diagram may be annotated with attack tags by the mapping engine 108 (408). In this context, the attack tags represent attack requirements in the sense that the attack tags characterize or identify aspects of individual application components that make them susceptible to, or otherwise associated with, certain types of attacks.

Subsequently, the global test plan generator 114 may create a number of attack tree instances of the attack tree model that corresponds to a number of architectural components, and may proceed to attach each such instance to its corresponding architecture component (410). For example, as in the example provided above, if the target architecture includes a database protected by firewall and communicating over an HTTP channel, then the first instance of the attack tree model may be attached to the firewall, and each leaf of the attack tree may then be attached to a second instance of the attack tree that is itself associated with the HTTP channel. Similarly, each resulting leaf of the second instance of the attack tree model may then be attached to a third instance of the attack tree, which is linked to the underlying database. Additional or alternative examples of operations for associating attack tree instances with individual architecture components are described below with respect to FIGS. 7-9.

Each attack tree instance may then be filtered, based on common attack tags, to thereby obtain an attack test model (412). For example, the scope down engine 116 may be configured to analyze each attack tree instance and its corresponding architecture component, and to selectively remove portions of the attack tree instance that do not have associated attack tags in common with one or more attack tags of the architecture component.

For example, each leaf of a given attack tree model instance that does not have an attack tag matching one or more attack tags of its associated architecture component may be removed. Then, if the removed leaf was connected to its connected node with an AND connector, the connected node may be removed as well. Meanwhile, if the removed leaf was connected to a node with an OR connector and all such leaves of the OR connector are removed by the scope down engine 116, than the connected node may be removed as well. These processes may be repeated recursively by the scope down engine 116, as described and illustrated below in more detail with respect to FIG. 9, until the attack tree model instance in question has been reduced to include only those remaining attack tags which represent viable potential attacks that can be executed against a corresponding architecture component.

The resulting attack test model, as illustrated and described above with respect to FIG. 3, may then be converted into multiple attack test workflows (414). As described above with respect to FIG. 3, an attack test workflow generated from an AND connector within the attack tree model instance will include all components connected thereto. In contrast, attack components connected by an OR connector will result in an individual attack test workflow for each connected attack component.

Once all such attack test workflows have been generated, the sorting module 118 may be configured to assign (or to utilize previously-assigned) weighting values for each workflow and workflow step (416). For example, the sorting module 118 may assign/utilize the weighting values based on a sorting criteria, where such criteria may include, without limitation, metrics such as cost, time, impact, complexity, and scope.

In this context, the weighting value of cost refers generally to financial resources required by a potential or hypothetical attacker in order to attempt execution of a given attack or type of attack. For example, breaking a password through the use of brute force calculation techniques may require a significant and costly quantity of processing power.

The weighting value of time refers to a time needed by the potential or hypothetical attacker in order to perform the attack. For example, cracking non-salted MD5 hashes may be completed relatively quickly, whereas cracking salted SHA2 hashes may be virtually impossible to complete within a reasonable or available amount of time.

Impact refers to a cost to the target application in the event that the hypothetical attack is successful. For example, loss of credit card numbers may have a bigger impact on a provider of a software application than, e.g., loss of a particular internet protocol (IP) address on which a particular component of the architecture executes.

Complexity refers to how difficult it is to execute a given attack. For example, if an attack may be executed over the internet, than the complexity will generally be lower than if the attack requires physical presence at a target machine of the target architecture.

Finally, in the examples, the term scope refers to whether a given attack should be considered by the set of tests or not. For example, some types of attacks may be ignored by a particular user of the system 100, on the basis that some other user or class of users within an organization is assigned to consider such attacks. In other examples, some tests may be required to be run only during a particular development phase of the application in question.

In practice, metrics associated with the various weighting values, such as those just described, may be assigned to (or included with) individual leaves of the attack tree instances remaining within the attack test model. Then, parent nodes may inherit the value of underlying child nodes. For example, in the case of AND connectors, the parent node may inherit a sum of its underlying nodes. In the case of OR connectors, the parent node may inherit a minimum (MIN) of the underlying nodes.

The sorting module 118 may then proceed to order the attack test workflows into a prioritized list, based on the sorting criteria as applied to the individual components of the attack test model. For example, by default, each node may be assigned a weight of one for each metric. Then, the weights may be adjusted by use of the system 100, e.g., by way of the attack tree model editor 104. In this way, the various weights may be stored directly with corresponding components of the original attack tree model 102.

The sorting module 118 may then sort the resulting attack test workflows, according to their total weight and with respect to the various storing criteria. For example, an attack scenario in which complexity and cost are low, and where a relatively small amount of time is required, yet where the resulting impact of the attack scenario is large, may be prioritized to ensure that a corresponding attack test workflow is executed first/early in the testing process.

Thus, in this way, the various attack test workflows may be sorted and executed (418). For example, as described and illustrated with respect to FIG. 1, the attack test workflows 120 may be provided to the test execution module 122, in order to execute the various attack test workflows using the attack knowledge base 124. In this regard, as referenced above, the attack knowledge base 124 may be utilized to capture internal best practices for executing various test cases. In general, the attack knowledge base 124 may be maintained by security experts, so that developers and other users of the system 100 who may not be security experts they continue to utilize and take advantage of the system 100.

If the test selected for execution cannot be completed, because, e.g., the execution steps are not sufficiently clear, or because an original mapping of one or more attack tags was incorrect, then the corresponding mapping can be marked for review. Thereafter, another workflow may be triggered in which the questionable mapping is considered by appropriate experts, leading either to removal of the mapping, refinement of the attack tree model, or clarification of the attack knowledge base 124.

If the test fails, i.e., the attack does not succeed, then the flow workflow is marked as failed. Ideally, such a result comes as quickly as possible, thereby indicating that the underlying attack is extremely unlikely to be executed successfully.

If a test of a given workflow step succeeds, i.e., the attack works, then a next step of the workflow is tested, until the test either fails, or until the full workflow succeeds. If the full attack test workflow does succeed, then a report 126 may be generated. The resulting report may thus explain in detail a full attack path used.

Thus, in such example implementations, each time a report is generated, the implication is that a successful exploit has been identified. Consequently, it may be presumed that at least one step of the workflow will be countered with a corresponding code fix of the application component being tested. In this regard, each attack step of a successfully-executed workflow may be marked as high priority, while each attack step of a failed workflow may be marked as relatively low priority.

Figure 5:
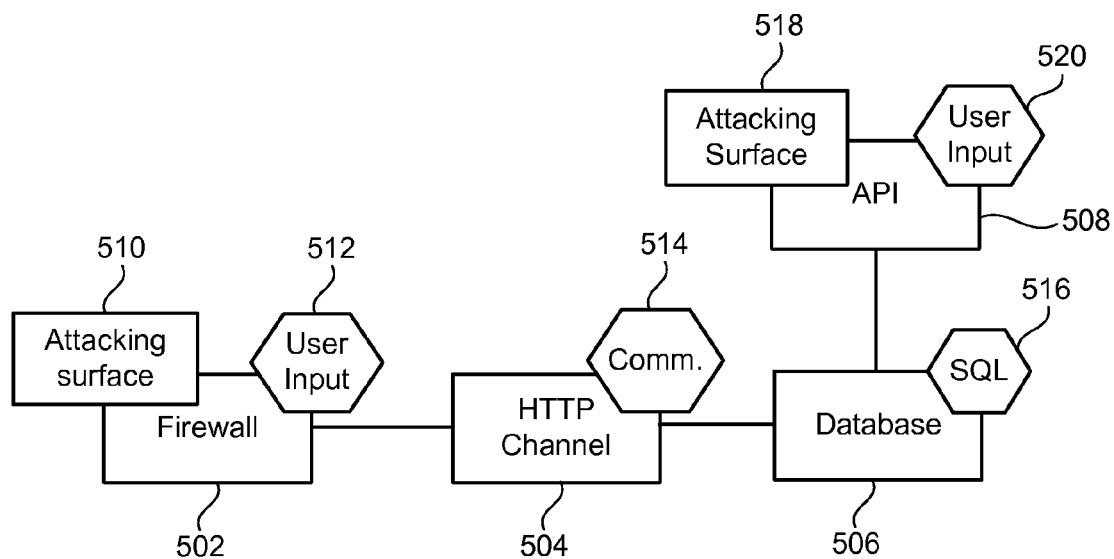
FIG. 5 is a block diagram of an example architecture diagram used in the system of FIG. 1.

FIG. 5 is a block diagram of an example architecture diagram, such as the architecture diagram 110 of FIG. 1. In the example of FIG. 5, it is assumed that an architecture diagram may be represented as a graph G=[V,E], in which V includes a set of nodes representing components in an application/architecture, where E represents a set of edges connecting such nodes and representing connections between architecture components.

In practice, some of the architecture components may be labeled as "attacking surfaces," meaning that an attacker could interact directly with such components to execute an attack. At the same time, each component may be further tagged with attack tags from the tag database 106, as described above.

In the example of FIG. 5, a firewall 502 is illustrated as being connected by an HTTP channel 504 to a database 506, which is itself also connected to an application program interface (API) thereof, represented by an API 508 in FIG. 5. Thus, the firewall 502 is associated with a tag 510 identifying the firewall as an attacking surface, as well as a tag 512 indicating that user input is received at the firewall 502. Meanwhile, the HTTP channel 504 is tagged with a tag 514 identifying it as a communication-related node. Meanwhile, in the example, a tag 516 identifies the database 506 as being an SQL database. Finally in the example of FIG. 5, the API 508 includes a tag 518 identifying the API 508 as an attacking surface, as well as a tag 520 indicating that the API 508 receives user input.

Thus, FIG. 5 represents a tagged or annotated architecture diagram, such as the architecture diagram 110 received at the global test plan generator 114 in conjunction with a tagged attack tree model, such as the attack tree model 102 of FIG. 1. In order to facilitate compatibility and combinability of the architecture diagram of FIG. 5 with such a tagged attack tree model, the global test plan generator 114 may first designate a component of the architecture diagram that may serve as a root node for a tree structure to be constructed as representing the architecture diagram. Then, each acyclic path from such a root node to an attacking surface in the architecture diagram becomes a path in the resulting tree structure.

For example, a component of the architecture diagram 110 may be selected as the root node if that component will represent a goal of an attack. The root node may be identified in this regard by a security expert, or may be manually or automatically selected, depending on the nature of the element. For example, a database containing confidential data may be a good candidate for being a root note. In additional examples, an application which contains two databases, each storing confidential data, may see both databases considered as targets for attacks. In such cases, two trees may be generated from the same architecture diagram: one where the first database is the root, and a second where the second database is the root.

Figure 6:
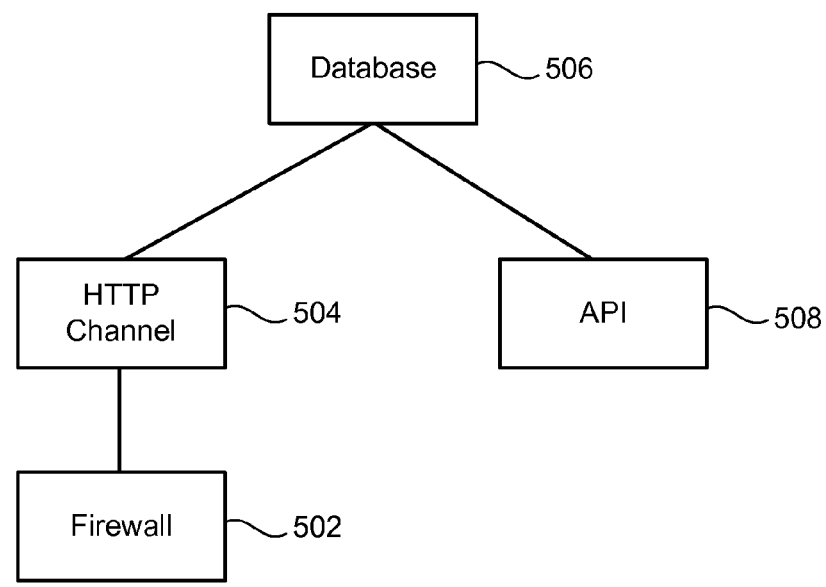
FIG. 6 is a block diagram of a tree model of the architecture diagram of FIG. 5, defined with respect to a selected component thereof.

Therefore, for example, FIG. 6 represents such a tree structure constructed from the example of FIG. 5. In the example of FIG. 6, the database component 506 is designated as the tree root. Consequently, as shown, the path from the database 506 to the API 508 defines one path in the tree, because the API 508 has been designated as an attacking surface. Similarly, FIG. 6 illustrates the second path from the database 506 through the HTTP channel 504 to the firewall 502, where, as illustrated and described with respect to FIG. 5, the firewall 502 represents a second attacking surface in the context of the architecture diagram of FIG. 5.

Figure 7:
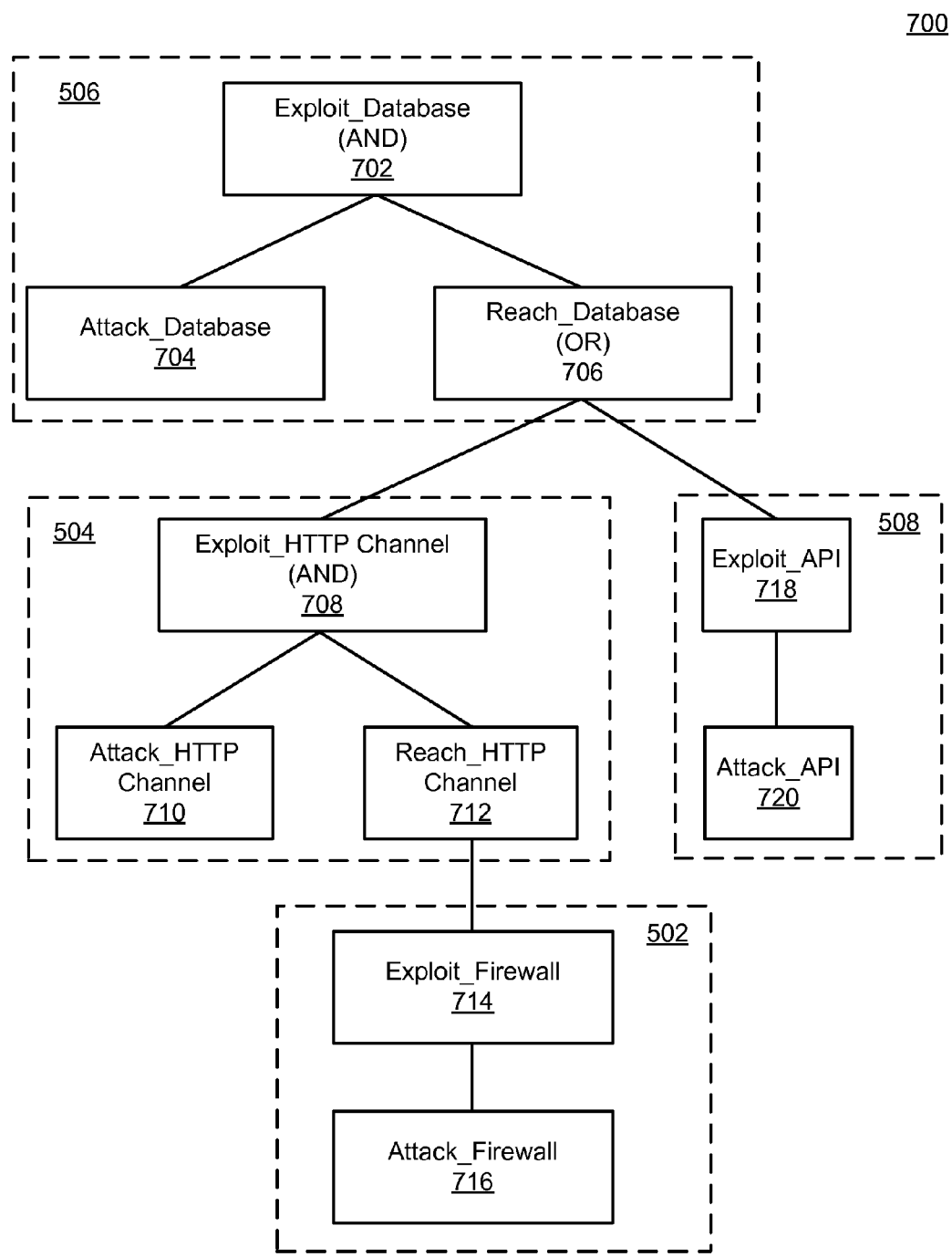
FIG. 7 is a block diagram of an initial attack test model defined with respect to the component tree of FIG. 5.

FIG. 7 illustrates an intermediate attack test model constructed by the global test plan generator 114, where the intermediate attack test model of FIG. 7 may be understood to represent an intermediate stage between the combination and transformation of the underlying architecture diagram 110 and corresponding attack tree model 102 into a final attack test model, an example of which is described and illustrated below with respect to FIG. 8. Specifically, as shown, FIG. 7 may be understood to correlate directly with the tree structure of FIG. 6. For example, as shown, FIG. 7 illustrates the database 506 connected to the HTTP channel 504 and thus to the firewall 502. FIG. 7 also illustrates the database 506 connection to the API 508, again as described and illustrated above with respect to FIG. 6.

In the example of FIG. 7, however, each of the components 502, 504, 506, 508 is replaced by a miniature tree. For example, with respect to the database 506, a miniature tree including components 702, 704, 706 is illustrated as replacing the underlying database component. As shown, the root of the miniature tree includes an exploit_database node 702, which serves as an AND connector with an attack database node 704 and a reach_database node 706.

As shown, the reach_database node 706 is itself an OR connector, which is connected to root nodes of similar miniature trees representing remaining components of the architecture diagram. As shown, the reach_database node 706 is connected to an exploit_HTTP channel node 708 of the HTTP channel component 704. As shown, the exploit_HTTP channel node 708, like the exploit_database node 702, serves as an AND connector with an attack_HTTP channel node 710 and a reach_HTTP channel node 712.

Continuing the example, the reach_ HTTP channel node 712 is connected to an exploit_firewall node 714 of the firewall component 502, which is itself connected to an attack_firewall node 716. Similarly, the reach_database node 706 of the database component 506 is connected to an exploit_API node 718 of the API component 508, which is itself connected to an attack_API node 720.

Thus, in summary, FIG. 7 illustrates an approach in which each branch component of the tree structure of FIG. 6 is replaced by a miniature tree rooted at an "exploit" node that is itself connected to two leaf nodes "attack" and "reach." Then, each such "reach" node is connected to all child nodes of the underlying component. Then, each leaf component (e.g., the firewall component 502 and the API component 508) is replaced by a similar miniature tree that does not include the "reach" node.

As shown, all "exploit" nodes are defined as AND nodes, while all "reach" nodes are defined as OR nodes. Consequently, with respect to FIG. 7, it may be observed that all leaf nodes in the intermediate attack test model are "attack" nodes, corresponding to the attacking surface tags 510, 518 of FIG. 5.

Figure 8:
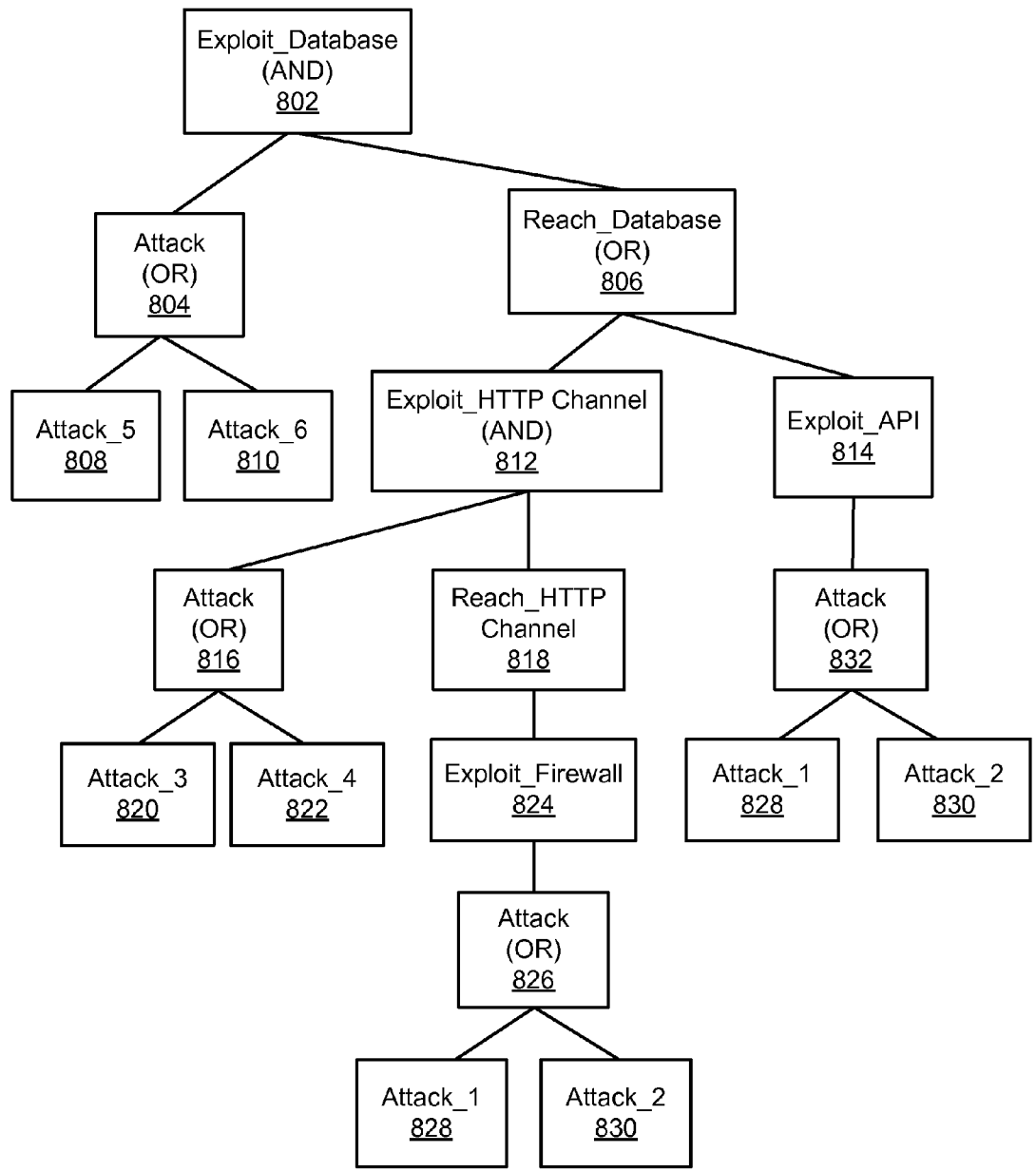
FIG. 8 is a block diagram of a finalized attack test model, derived from the initial attack test model of FIG. 7.

As referenced below, FIG. 8 represents a completed attack test model derived from the intermediate attack test model of FIG. 7. That is, the attack test model of FIG. 8 corresponds generally to the attack test model of FIG. 3, but is illustrated in more detail and with respect to the various components 502, 504, 506, 508 described and illustrated above with respect to FIG. 5.

As described above with respect to the operation 412 of FIG. 4, the scope down engine 116 may be configured to prune the intermediate attack test model of FIG. 7 to obtain the attack test model of FIG. 8. Specifically, as referenced above, the scope down engine 116 may consider each leaf node 716, 720 of the intermediate attack test model. Then, a suitable set of recursive pruning/filtering rules may be applied, based on corresponding attack tags of the underlying component 502, 508.

Specifically, for example, any such leaf node that is not annotated with any tag of its underlying component may be removed. If a removed node is a child node of an AND node, then the AND node may be removed as well. Meanwhile, if all child nodes of an OR node are removed, then the OR node itself may also be removed.

Thus, in the example of FIG. 8, the exploit_database node 802 is illustrated as being connected to an attack node 804 and a reach_database node 806. In the example, the attack node 804 is illustrated as being associated with attack_5 808 and attack_6 810, which may be understood to generically represent attacks from within a corresponding attack tree model instance and having matching attack tags, as determined by the global test plan generator 114. As shown, the reach_database node 806 is connected to an exploit_HTTP channel 812 and an exploit_API node 814. The exploit_HTTP channel node 812 is connected to an attack node 816 and a reach_HTTP channel node 818. As shown, the attack node 816, an OR connector, is connected to an attack_3 820 and an attack_4 822, where, again, the attacks 820, 822 represent attacks from the corresponding attack tree model instance having attack tags matching the underlying HTTP channel component 504. Further, the reach_HTTP channel node 818 is connected to the exploit_firewall node 824, which is itself connected to an attack node 826 representing an OR connector between attack_1 828 and attack_2 830. Finally in FIG. 8, the exploit_API node 814 is connected to an attack node 832. As shown, the attack node 832 represents an OR connector between attack_1 828 and attack_2 830, thereby illustrating that the same attacks useful against the firewall component 502 may similarly be used against the API component 508.

Thus, attack test workflows may be generated from the attack test model of FIG. 8. For example, some such attack test workflows may include, e.g., attack_1 followed by attack_5. In another example, an attack test workflow may include attack_1 followed by attack_3 followed by attack_6. Yet another example would include attack_2 followed by attack_4 followed by attack_6. As described, each such attack test workflows may be weighted and sorted based on, e.g., the above-described criteria, such as cost, impact, complexity, or time.

Figure 9:
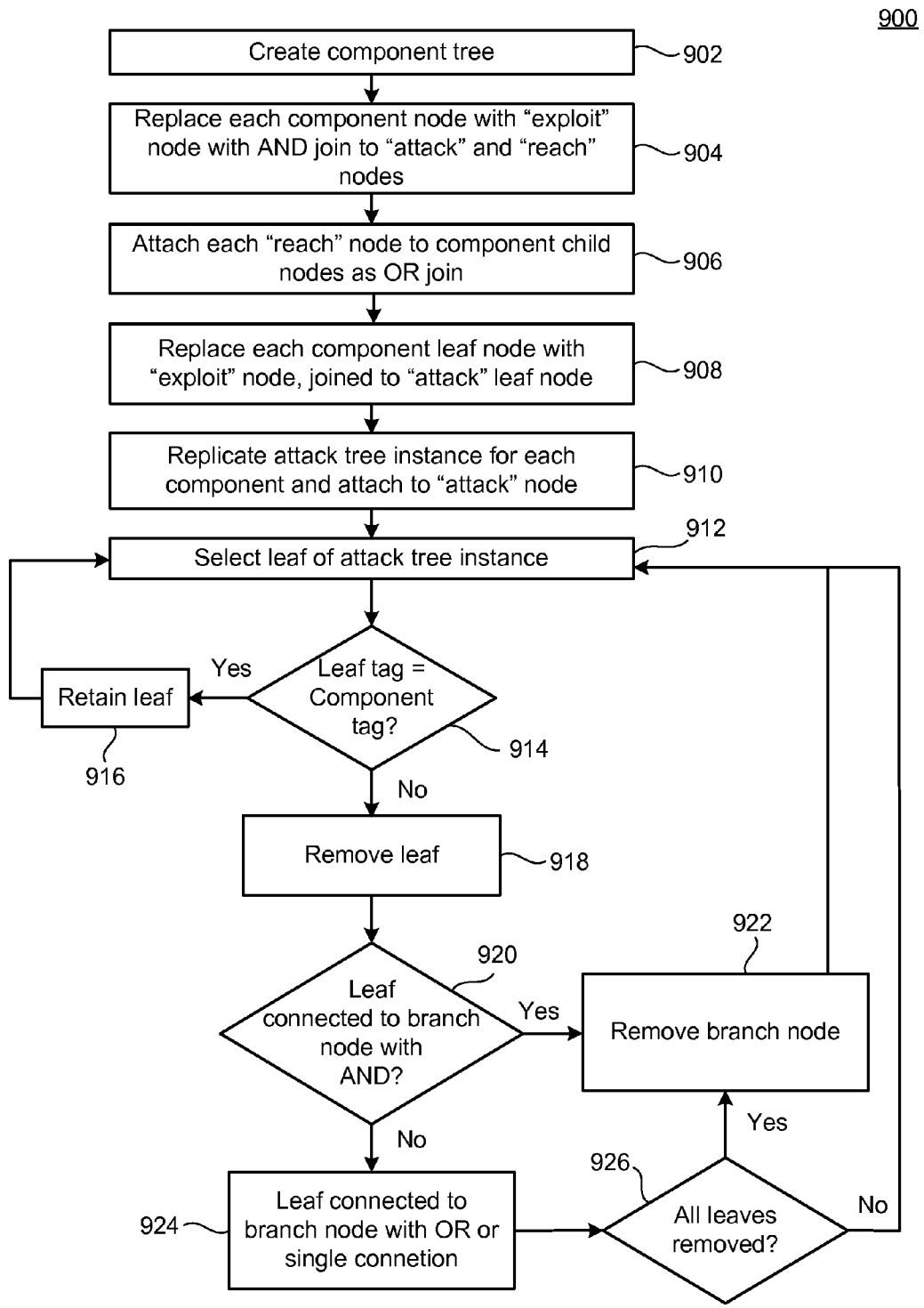
FIG. 9 is a flowchart illustrating example operations of the system of FIG. 1 with respect to the example of FIGS. 5-8.

FIG. 9 is a flowchart 900 illustrating example operations described above with respect to FIGS. 5-8. In the example of FIG. 9, a component tree structure may be created from the underlying architecture diagram (902). Then, each component node of the component tree structure may be replaced. Specifically, each root or branch component node may be replaced with a "exploit" node performing an AND joined to "attack" and "reach" nodes (904).

Then, each such "reach" node may be attached to component child nodes an OR join (906). Each component leaf node may be replaced with a "exploit" node joined to an "attack" leaf node (908).

Thereafter, attack tree instances of the underlying attack tree model may be replicated for each component and attached to each "attack" node (910). Then, a leaf node of each attack tree instance may be selected (912). If the attack tag of the leaf node matches the corresponding component tag (914), then the leaf node may be retained (916) and a next leaf node may be selected (920).

If the tags do not match (914), then leaf node of the attack tree instance may be removed (918). If the removed leaf was connected to a branch node as an AND connector (920), then the entire branch node may be removed (922), and a subsequent leaf node may be selected (912).

If the leaf node being removed was not connected to the branch node with an AND connector (920), then it may be determined that the leaf node was connected to the branch node by way of an OR connector or a single connection (924). In this case, if all such leaves of the OR connector have been removed (926), then the connected branch node may be removed as well (922). If not, or once the corresponding branch node has been removed, then the next leaf node may be selected (912). In this way, the attack tree instance may be recursively pruned until a final version of the attack tree instance is reached. Similar operations may be executed for each such attack tree instance.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one processor, the system comprising:
   a mapping engine configured to cause the at least one processor to
      access, from at least one computer memory, an attack model enumerating software attacks, the software attacks being represented by linked attack components,
      access, from the at least one computer memory, a software architecture to be tested, the software architecture including a plurality of components and being represented by linked architectural components in an architecture diagram, including at least a first architectural component and a second architectural component representing corresponding components of the plurality of components,
      access a tag database storing a plurality of attack tags, and select individual attack tags therefrom for attachment to individual components of the attack model and of the architecture diagram, and
      link, within the at least one computer memory, each attack component and each architectural component with at least one attack tag characterizing attack requirements;
   a global test plan engine configured to cause the at least one processor to construct an attack test model, including generating a first instance of the attack model for the first architectural component and a second instance of the attack model for the second architectural component and linking, within the at least one memory, at least a first attack component of the first instance with the first architectural component and at least a second attack component of the second instance with the second architectural component and further configured to cause the at least one processor to generate an executable attack test workflow from the attack test model; and
   a test execution engine configured to cause the at least one processor to execute the attack test workflow to thereby test the software architecture,
   wherein the global test plan generator includes a scope down engine configured to cause the at least one processor to filter the first instance and the second instance of the attack model, based on correspondence of attack tags of each instance with its corresponding architectural component.

2. The system of claim 1, comprising:
   an attack model editor configured to provide a first user interface operable to edit the attack tree model; and
   a diagram editor configured to provide a second user interface operable to edit the architecture diagram.

3. The system of claim 1, wherein the linked attack components of the attack model are arranged in a tree structure, in which individual parent attack components represent an attack result or attack operation, and are connected by branches to one or more child components representing attack operations for reaching the attack result or attack operation of the parent component.

4. The system of claim 1, wherein the global test plan generator is configured to cause the at least one processor to generate the attack test workflows including traversing the attack test model from each attacking surface thereof along individual paths to a tested architecture component of the architecture diagram.

5. The system of claim 1, wherein the global test plan generator includes a sorting module configured to cause the at least one processor to utilize weighting values assigned to individual ones of the attack test workflows to create a sorted, prioritized list of the attack test workflows.

6. A system including instructions recorded on a non-transitory computer-readable medium, and executable by at least one processor, the system comprising:
   a mapping engine configured to cause the at least one processor to
      access, from at least one computer memory, an attack model enumerating software attacks, the software attacks being represented by linked attack components,
      access, from the at least one computer memory, a software architecture to be tested, the software architecture being represented by linked architectural components in an architecture diagram, and
      link, within the at least one computer memory, each attack component and each architectural component with at least one attack tag characterizing attack requirements; and
   a global test plan engine configured to cause the at least one processor to construct an attack test model, including linking, within the at least one memory, attack components with corresponding architectural components, based on associated attack tags, and further configured to cause the at least one processor to generate executable attack test workflows from the attack test model, to thereby test the software architecture, wherein the mapping engine is configured to cause the at least one processor to access a tag database storing a plurality of attack tags, and to select individual attack tags therefrom for attachment to individual components of the attack model and of the architecture diagram.

7. A system including instructions recorded on a non-transitory computer-readable medium, and executable by at least one processor, the system comprising:
   a mapping engine configured to cause the at least one processor to
      access, from at least one computer memory, an attack model enumerating software attacks, the software attacks being represented by linked attack components,
      access, from the at least one computer memory, a software architecture to be tested, the software architecture being represented by linked architectural components in an architecture diagram, and link, within the at least one computer memory, each attack component and each architectural component with at least one attack tag characterizing attack requirements; and a global test plan generator configured to cause the at least one processor to construct an attack test model, including linking, within the at least one memory, attack components with corresponding architectural components, based on associated attack tags, and further configured to cause the at least one processor to generate attack test workflows from the attack test model, wherein the test execution engine is further configured to cause the at least one processor to provide feedback to the mapping engine characterizing an accuracy of the mapping engine in associating attack tags with one or more attack component and/or architectural component.

8. A computer-implemented method for executing instructions stored on a computer readable non-transitory storage medium, the method comprising:

determining an attack model enumerating software attacks, the software attacks being represented by linked attack components;

determining a software architecture to be tested, the software architecture including a plurality of components and being represented by linked architectural components in an architecture diagram, including at least a first architectural component and a second architectural component representing corresponding components of the plurality of components;

accessing a tag database storing a plurality of attack tags, and selecting individual attack tags therefrom for attachment to individual components of the attack model and of the architecture diagram;

associating each attack component and each architectural component with at least one attack tag characterizing attack requirements;

determining an attack test model, including generating a first instance of the attack model for the first architectural component and a second instance of the attack model for the second architectural component and associating at least a first attack component of the first instance with the first architectural component and at least a second attack component of the second instance with the second architectural component, and further including filtering the first instance and the second instance of the attack model, based on correspondence of attack tags of each instance with its corresponding architectural component;

generating an executable attack test workflow from the attack test model; and executing the attack test workflows to thereby test the software architecture.

9. The method of claim 8, wherein the generating the attack test workflows includes traversing the attack test model from each attacking surface thereof along individual paths to a tested architecture component of the architecture diagram.

10. The method of claim 8, wherein the generating the attack test workflows includes utilizing weighting values assigned to individual ones of the attack test workflows to create a sorted, prioritized list of the attack test workflows.

11. The method of claim 8, wherein the linked attack components of the attack model are arranged in a tree structure, in which individual parent attack components represent an attack result or attack operation, and are connected by branches to one or more child components representing attack operations for reaching the attack result or attack operation of the parent component.

12. A computer program product, the computer program product being tangibly embodied on a non-transitory computer-readable storage medium and comprising instructions that, when executed, are configured to:

determine an attack model enumerating software attacks, the software attacks being represented by linked attack components;

determine a software architecture to be tested, the software architecture including a plurality of components and being represented by linked architectural components in an architecture diagram, including at least a first architectural component and a second architectural component representing corresponding components of the plurality of components;

access a tag database storing a plurality of attack tags, and select individual attack tags therefrom for attachment to individual components of the attack model and of the architecture diagram;

associate each attack component and each architectural component with at least one attack tag characterizing attack requirements;

determine an attack test model, including generating a first instance of the attack model for the first architectural component and a second instance of the attack model for the second architectural component and associating at least a first attack component of the first instance with the first architectural component and at least a second attack component of the second instance with the second architectural component, and further including filtering the first instance and the second instance of the attack model, based on correspondence of attack tags of each instance with its corresponding architectural component;

generate an executable attack test workflow from the attack test model; and execute the attack test workflows to thereby test the software architecture.

13. The computer program product of claim 12, wherein the linked attack components of the attack model are arranged in a tree structure, in which individual parent attack components represent an attack result or attack operation, and are connected by branches to one or more child components representing attack operations for reaching the attack result or attack operation of the parent component.

14. The computer program product of claim 12, wherein the instructions, when executed, are further configured to utilize weighting values assigned to individual ones of the attack test workflows to create a sorted, prioritized list of the attack test workflows.

15. A computer program product, the computer program product being tangibly embodied on a non-transitory computer-readable storage medium and comprising instructions that, when executed, are configured to:

determine an attack model enumerating software attacks, the software attacks being represented by linked attack components;

determine a software architecture to be tested, the software architecture being represented by linked architectural components in an architecture diagram;

associate each attack component and each architectural component with at least one attack tag characterizing attack requirements;

determine an attack test model, including associating attack components with corresponding architectural components, based on associated attack tags;

generate attack test workflows from the attack test model, to thereby test the software architecture, wherein the instructions, when executed, are further configured to associate each attack component and each architectural component with at least one attack tag characterizing attack requirements, including accessing a tag database storing a plurality of attack tags, and selecting individual attack tags therefrom for attachment to individual components of the attack model and of the architecture diagram.

* * * * *